United States Patent [19]
Porter et al.

[11] Patent Number: 5,092,714
[45] Date of Patent: Mar. 3, 1992

[54] PNEUMATIC CASH TRANSFER SYSTEMS AND CANISTERS FOR USE THEREIN

[75] Inventors: Alexander D. D. Porter, London; Avi Rosenthal, Gillingham, both of England

[73] Assignee: Tripmatic Limited, London, England

[21] Appl. No.: 603,709

[22] PCT Filed: May 19, 1989

[86] PCT No.: PCT/GB89/00552
§ 371 Date: Nov. 16, 1990
§ 102(e) Date: Nov. 16, 1990

[87] PCT Pub. No.: WO89/11430
PCT Pub. Date: Nov. 30, 1989

[30] Foreign Application Priority Data
May 20, 1988 [GB] United Kingdom ............... 8812036

[51] Int. Cl.[5] ............... B65G 51/06; B65G 51/26; B65G 51/34
[52] U.S. Cl. ............... 406/186; 406/184; 406/111; 406/112
[58] Field of Search ............... 406/184, 186, 111, 190, 406/112

[56] References Cited
U.S. PATENT DOCUMENTS 797,044  8/1905  Burl ............... 406/186
1,613,471  1/1927  Maclaren ............... 406/186
1,826,833  10/1931  Shannehan ............... 406/186

FOREIGN PATENT DOCUMENTS 562482  10/1977  U.S.S.R. ............... 406/186

Primary Examiner—Margaret A. Focarino
Assistant Examiner—James M. Kannofsky
Attorney, Agent, or Firm—Leydig, Voit & Mayer

[57] ABSTRACT

A pneumatic cash transfer system for use in banks and building societies to link a cashier station (1) to a remote teller assist unit (3) and a cash deposit box (4) in a separate secure area (5) comprises an air tube (6) extending between a tube terminal (7) at the cashier station and a tube terminal (8) in the secure area (5), and a cash carrying canister (10) movable pneumatically in the tube (6) between the two terminals (7, 8). The canister (10) is open at its side to permit insertion and removal of bank notes, and comprises a bank note holder (22) formed by a pair of spring-biassed clamping plates (23, 24) for holding bank notes firmly in the canister during travel in the tube (6). At the terminal (8) in the secure area (5) the holder (22) can be opened automatically to release notes to be deposited into the deposit box (4), and on closure of the holder it is ready to receive notes which are fed positively into the holder from the teller assist unit (3) for transmission to the cashier.

14 Claims, 3 Drawing Sheets

PNEUMATIC CASH TRANSFER SYSTEMS AND CANISTERS FOR USE THEREIN

Security for both cash and staff has always been of major concern to banks, building societies, and other cash handling businesses (e.g. post offices) in which cash is dispensed and received by cashiers. Past attempts to reduce the level of risk inherent in such cash handling operations have included, inter alia, the introduction of security screens or grilles and teller assist units at counter positions, but even these have proved to be of only limited deterrent to the determined and ruthless criminal.

Now, with the increasing level of competition currently taking place within the financial services industry, the marketing of such services is becoming much more customer oriented. In particular, there is an accelerating trend towards "open plan" branches, personal counselling and dealing across a desk in place of the traditional counter serivce, and a move towards giving over as much space as possible to the customer. These trends increase the security problem even further.

Cashiers operating at a desk station generally have a teller assist unit, which is a unit containing a stock of cash in a locked housing and providing the facility for the withdrawal of cash in required amounts in response to a request entered by the cashier. Such units may also be known as automatic teller safes or by some other name, but hereinafter they will be referred to as teller assist units, or TAU's for short. TAU's are similar in operation to the automatic cash dispensers which many banks and building societies provide for out-of-hours withdrawals, but as stand-alone units located at desk or other cashier points, they have disadvantages in that they remain vulnerable to particularly determined criminals, and their stocks of cash cannot be recirculated during business hours.

With the aim of overcoming these disadvantages it has been proposed to remove the TAU's from the cashier area to a remote and separate secure area, which may be time-locked, and to link each cashier station to its TAU by means of a pneumatic cash transfer system comprising an air tube in which a canister is moved back and forth in response to air pressure differentials created between the opposite ends of the tube to carry cash from the TAU to the cashier station and, if desired, from the cashier station to a deposit box also located in the secure area.

Air tube conveyor systems have been known for many years as a means of transporting a wide range of items (documents, valuables, samples, spare parts etc.) between different locations within a building, or even between adjoining buildings, and with suitable electronic controls it is considered that such a system is ideal for the above purpose. Air tube conveyor systems are capable of operating over any distance and in virtually any building, whether it is new or existing, and routes can be concealed above ceilings or below floors depending on the constructional constraints of the building concerned.

The above proposal using a pneumatic cash transfer system should serve to produce a much safer environment in banks, building societies, etc., where cashier/customer transactions take place. The system is such that no cash need be held at the cashier station (with the possible exception of a small float of loose coins), yet precise amounts of cash can be called up quickly as required from a secure area, and deposits can be sent back. Thus, at any time the only cash at risk will be the coin float and that which is being handled in the course of the current transaction. Furthermore, depending on the user's normal operating procedures, a full stock of cash will be available for immediate recycling at all times, and if recharging of any TAU becomes necessary this can be carried out in total security.

The present invention relates to such a pneumatic cash handling system for linking a cashier station to a remote TAU in a secure area, and is particularly concerned with a canister for carrying bank notes in such a system.

According to a first aspect of the invention, there is provided a canister for carrying bank notes in an air tube conveyor system comprising a pair of interconnected end members, a side opening extending substantially the length of the canister between the end members to permit bank notes to be fed into the canister, and a bank note holder arranged to receive and retain bank notes fed into the canister through the side opening, the bank note holder comprising a pair of clamping plates which are mounted between the end members and are biased towards each other to a closed position for retaining bank notes inserted between the plates, characterised in that the clamping plates are shaped and mounted so that, in the closed position, they define a substantially V-shaped trough in which bank notes are received and are retained between the lower longitudinal edge portions of the plates at the root of the V-shaped trough.

Generally such a canister will be designed for use in a system in which the bank notes are placed positively into the bank note holder, the clamping plates allowing the notes to be pushed easily between them while in the closed position so that the notes are immediately gripped and retained by the holder.

Preferably each of the end members is freely rotatably mounted in an end cap having a peripheral portion arranged to engage the air tube wall during travel of the canister through the tube, and at least one of the end members is eccentrically weighted so that the interconnected end members will together rotate relative to the end caps to a predetermined position when the canister is at rest. In this way it can be ensured that the bank note holder will always be oriented correctly when the canister comes to rest, irrespective of any frictional resistance between the end caps and the air tube.

According to a second aspect of the invention, there is provided a pneumatic cash handling system comprising an air tube, a canister as defined above freely slidable along the length of the tube between a cashier station tube terminal and a TAU tube terminal in a secure area remote from the cashier station, and means for controlling the air pressure in the tube to drive the canister back and forth between the two tube terminals, the TAU tube terminal (and preferably also the cashier station tube terminal) comprising a portion of the air tube having a longitudinally extending opening in its wall for providing access to the bank note holder of the canister when the canister is received in the tube terminal, means for stopping the canister in the tube terminal in a predetermined position relative to the opening, a rotatable sleeve closely surrounding the tube portion of the terminal and having a longitudinally extending opening substantially corresponding to the tube opening, and means for rotating the sleeve to move it between an open position in which its opening registers with the tube opening and a closed position in which the tube opening is shut by the sleeve.

The system will be provided with a suitable automatic control system linked to the TAU and operated from the cashier station, e.g. via a keyboard. In operation, if a customer wishes to make a cash withdrawal, the cashier keys the nature of the transaction and the amount required (preferably after first keying a security access code) and the system then operates automatically to ensure that the canister is correctly located at the TAU tube terminal (which preferably will be arranged to be the canister's home station), to open the terminal, to receive the required number and denomination of bank notes from the TAU into the holder, to close the terminal, and to send the canister to the cashier station tube terminal. Preferably the system also operates automatically to open the cashier station tube terminal when the canister arrives, so that the cashier simply has to lift the notes from the holder. However, the opening of the cashier station tube terminal may be manual if preferred.

Generally the system will be required also to handle cash deposits as well as withdrawals, and for this purpose the canister preferably has a side opening which permits bank notes to be discharged from the canister at a position substantially diametrically opposite that at which the notes are fed in, and the bank note holder is movable to a release position to allow bank notes to fall from the holder through the discarge side opening. In addition, the tube portion of the TAU tube terminal has a second longitudinally extending opening disposed at the bottom of the tube portion diametrically opposite the first opening thereof, and the sleeve also has a second longitudinally extending opening diametrically opposite the first sleeve opening and substantially corresponding to the second opening of the tube portion so that each sleeve opening registers with the corresponding opening of the tube portion when the sleeve is moved to the open position and both openings of the tube portion are shut when the sleeve is moved to the closed position, the TAU tube terminal also comprising means for causing the bank note holder of the canister to release bank notes for discharge through the registering second openings of the tube portion and the sleeve when the sleeve is in the open position and the notes are to be deposited in the secure area.

To assist further understanding of the invention, preferred examples of the canister and pneumatic cash handling system in accordance with the invention will now be described with reference to the accompanying diagrammatic drawings, in which.

Figure 1:
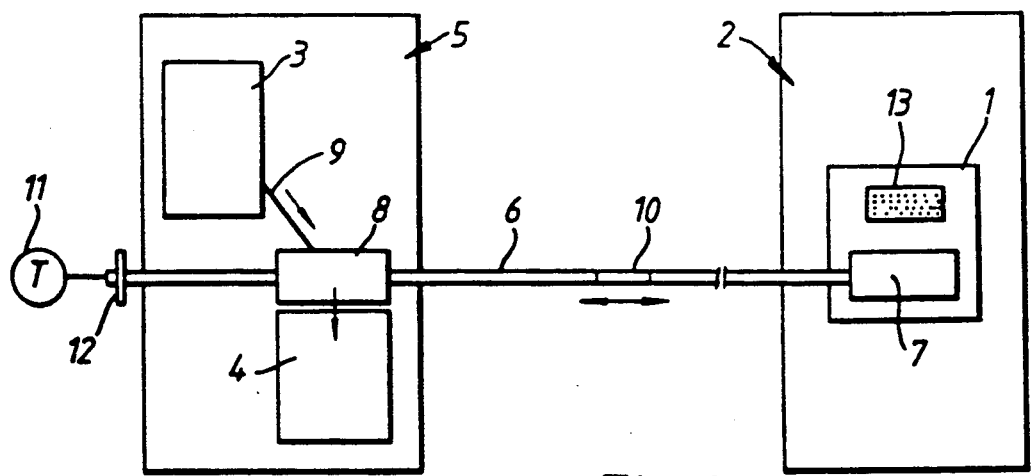
FIG. 1 illustrates the general layout of one example of a system in accordance with the invention.

The pneumatic cash transfer system illustrated in FIG. 1 links a single cashier station 1, for example a desk station, in an opening transaction area 2 of a bank or building society to a teller-assist unit (TAU) 3 and a cash deposit box 4 located in a secure, time-locked area 5 remote and separate from the transaction area 2. The system comprises an air tube 6 extending between a tube terminal 7 at the cashier station 1 and a tube terminal 8 in the secure area 5, the terminal 8 being located above the cash deposit box 4 and below a bank note feed device 9 from the TAU 3. Slidable within the air tube 6 is a canister 10 for carrying bank notes between the two tube terminals 7 and 8, and connected to the air tube at the TAU tube terminal 8 is a turbine blower 11 capable of selectively applying by means of a diverter 12 either suction of pressurised air to the air tube in order to move the canister 10 from the cashier station tube terminal 7 to the TAU tube terminal 8 or vice versa respectively. A speed of about ten meters/second should be possible. The diverter 12 is also capable of shutting off the blower 11 from the air tube 6 when not required. The system is controlled by the cashier at the cashier station 1 via a keyboard 13.

Figure 2:
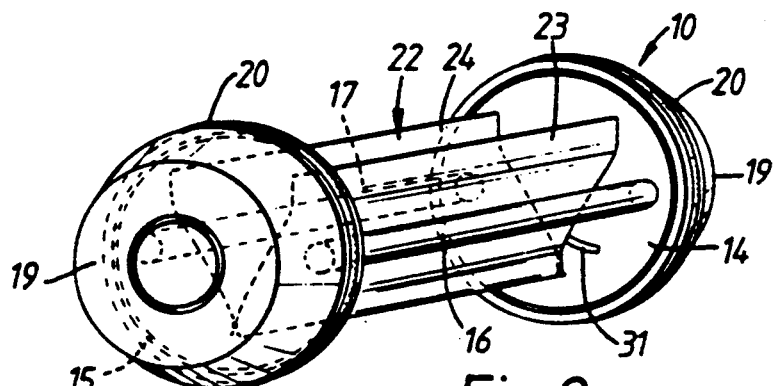
FIG. 2 is a perspective view of one example of a canister in accordance with the invention for use in the system of FIG. 1.
Figure 3:
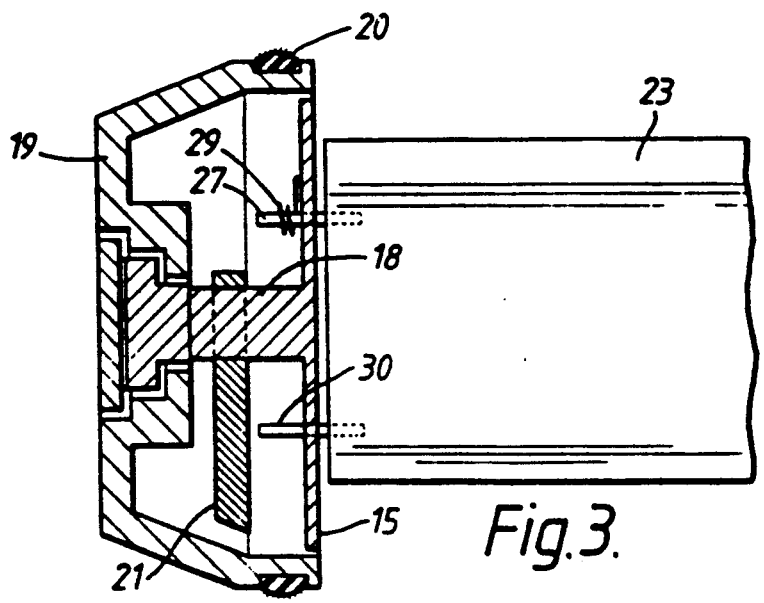
FIG. 3 is an axial section through one end of the canister.
Figure 4:
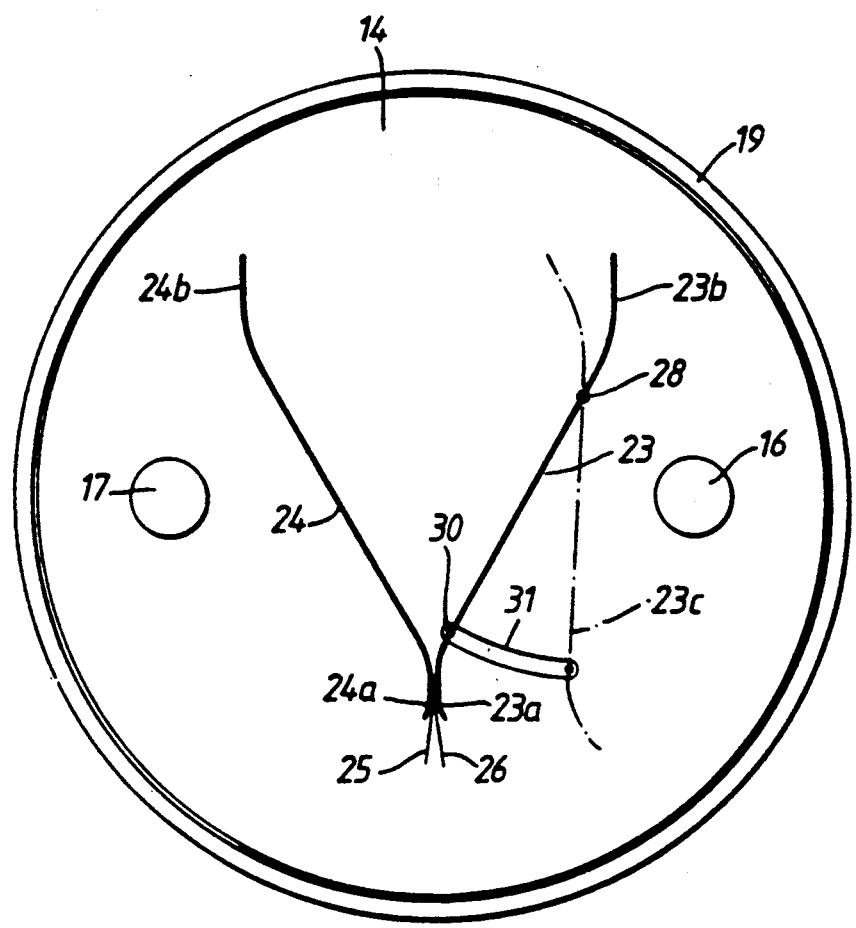
FIG. 4 is a cross-section through the canister in a plane perpendicular to its longitudinal axis and approximately mid-way between its ends.

The canister 10 illustrated in FIGS. 2 to 4 comprises a pair of axially spaced circular end plates 14,15 which are rigidly interconnected by a pair of connecting rods 16,17 extending parallel to a common axis of the end plates and disposed symmetrically on opposite sides thereof inwardly of the rims of the end plates. As shown in FIG. 3 in relation to the end plate 15, each end plate 14,15 is rigidly connected to a shaft 18 extending axially from its outer face, and a cup-shaped end cap 19 is rotatably mounted on this shaft 18 by means of a bearing (not shown). The rim of the end cap 19 closely surrounds the end plate and is fitted on its outer periphery with a circumferential seal 20 made of a suitable low friction material to facilitate the movement of the canister through the air tube. Mounted on the shaft 18 within the space bounded by the end cap 19 at either or both ends of the canister is an eccentric weight 21 so that the centre of gravity of the portion of the canister rotatably mounted between the end caps is displaced radially from its longitudinal axis. Thus, irrespective of the angular position of the end caps 19, gravitational action will always cause the central portion of the canister to adopt a predetermined position when the canister is at rest as a result of the central portion being free to rotate relative to the end caps.

The canister 10 is completely open at the side so that it effectively has a single side opening extending the length of the canister between the end plates 14,15 and circumferentially all the way round the canister. Furthermore, the canister comprises a bank note holder 22 mounted between the end plates 14,15 are comprising a pair of clamping plates 23,24 which are spring-biased relatively towards each other to a closed, clamping position. The clamping plates 23,24 are shaped and mounted so that, in the clamping position as shown in FIGS. 2 and 4, they define a substantially V-shaped trough with convexly curved lower edge portions 23a,24a biased towards engagement with each other at a position offset from the axis of the canister in the direction of its eccentric centre of gravity, and with their upper edge portions 23b,24b spaced relatively widely apart to allow bank notes to be fed positively into the holder. The spring bias acting on the clamping plates is such that a number of bank notes inserted into the holder can be pushed relatively easily between the closed lower edge portions 23a,24a, but will remain held therebetween when released by the insertion mechanism.

In order to facilitate the insertion of only one or two notes at a time, however, it is preferable that the lower edge portions 23a,24a of the clamping plates do not actually meet but are slightly spaced from each other in the closed position as shown in FIG. 4. In this case each clamping plate 23,24 is provided with a plurality of flexible fingers 25,26 respectively, for example of a plastics material, which extend from its lower longitudinal edge portion at intervals along the length thereof and interdigitate with the fingers of the other clamping plate as shown, the fingers 25,26 being deflectable to allow the banl notes to be inserted and held between them.

If desired the insertion of bank notes between the clamping plates 23 and 24 may be facilitated by coating the facing surfaces of the plates with a low friction material such as polytetrafluoroethylene, and the gripping action of the plates may be improved by providing the facing surfaces of at least the lower portions of the plates with a number of ribs (not shown) lying in planes perpendicular to the axis of the canister and offset from each other.

One of the clamping plates 24 is fixed in position relative to the end plates 14,15, while the other clamping plate 23 is pivotally mounted on the end plates by pivot pins 27 so that the plate 23 is able to pivot about an axis 28 which is parallel to the axis of the canister and is positioned toward the upper edge portion 23b of the clamping plate. The pivot pins 27 are carried by the clamping plate 23 and are received in bearings fitted in the end plates, the pins 27 projecting into the space bounded by the end caps 19 where they co-operate with springs 29 so that the clamping plate 23 is biased to pivot in a direction to move its lower end portion towards the lower edge portion of the fixed plate 24. As will be appreciated, pushing the upper edge portion 23b of the pivoted clamping plate 23 towards the fixed clamping plate 24 while preventing rotation of the end plates 14,15 will cause the lower edge portion 23a of the pivoted clamping plate to move away from the fixed clamping plate 24 against the action of the biassing springs 29 so that the lower end of the holder 22 is thereby opened to release bank notes therefrom. Near its lower edge position 23a, the pivoted clamping plate 23 has a further pair of pins 30 projecting into arcuate guide slots 31 provided in the end plates 14,15 for guiding the movement of the lower edge portion of the clamping plate 23 during opening and closing of the holder 22. The ends of the slots 31 also serve to limit the open and closed positions of the holder 22.

Figure 5:
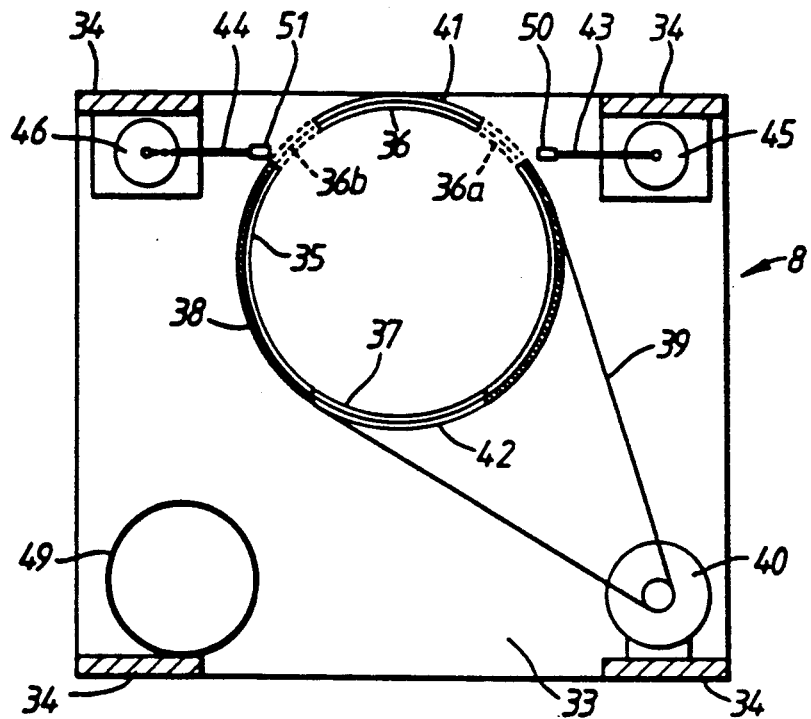
FIG. 5 is a cross-section through one example of a TAU tube terminal for use in the system of FIG. 1, taken on the line V—V in FIG. 6.
Figure 6:
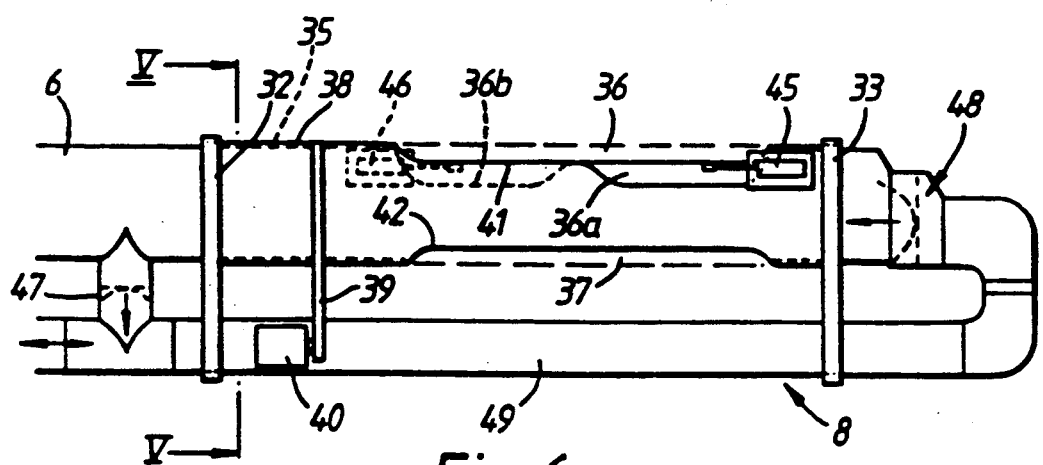
FIG. 6 is a side elevation of the tube terminal of FIG. 5.

Turning now to FIGS. 5 and 6, a TAU tube terminal 8 is shown comprising a support frame formed by a pair of axially spaced rectangular end plates 32,33 interconnected at the corners by longitudinally extending bars 34. The air tube 6 of the system extends horizontally through, and is supported by, each end plate 32,33 and the portion 35 of the air tube between the end plates is provided with upper and lower longitudinally extending openings 36,37 respectively which are positioned diametrically opposite each other. The lower opening 37 is symmetrical about its longitudinal axis, whereas the upper opening 36 has each end offset in opposite circumferential directions to provide a wider portion 36a on one side at one end, and a corresponding wider portion 36b on the other side and at the other end.

A cylindrical sleeve 38 closely surrounds the tube portion 35 between the end plates 32,33 and is rotatable about the tube portion by means of a drive belt 39 driven by an electric motor 40 mounted on one of the frame bars 34. The sleeve 38 is provided with a pair of diametrically opposite, longitudinally extending openings 41,42 corresponding in shape and size to the openings 36,37 of the tube portion 35. Thus, the sleeve 38 can be rotated to an open position in which its openings 41,42 register with the openings 36,37 of the tube portion 35, and can also be rotated to a closed position in which the sleeve openings and the tube openings are totally out of registry and the tube openings are thereby closed by the walls of the sleeve between its openings.

A pair of holder opening levers 43,44 are pivotally mounted on the upper frame bars 34 on opposite sides of the sleeved tube portion 35 so that, when the sleeve 38 is in the open position, the levers 43,44 are capable of moving horizontally into the interior of the tube portion 35 through the widened portions 36a,36b respectively of its upper opening. The levers 43,44 are pivoted into and out of the tube 35 by means of solenoid operated actuators 45,46 also mounted on the upper frame bars 34. If preferred, the actuators 45,46 may be pneumatically or hydraulically operated.

Advantageously, the turbine blower 11 for driving the canister 10 back and forth between the cashier station tube terminal 7 and the TAU tube terminal 8 is connected through the diverter 12 to the air tube 6 at a position adjacent the near end of the TAU tube terminal (relative to the cashier tube terminal) via a non-return valve 47 which permits air to be sucked from the air tube but not to be blown into the tube, and is also connected to the air tube at a position adjacent the far end of the TAU tube terminal via a non-return valve 48 which permits air to be blown into the air tube but not to be sucked therefrom. As illustrated in FIG. 6, in this example the air tube 6 is connected beyond the TAU tube terminal 8 through the valve 48 to a duct 49 which leads back through the end plates 32,33 of the terminal to the turbine blower and diverter (not shown), the valve 47 connecting the duct 49 to the air tube 6 in front of the terminal 8. With this arrangement, a canister is moved from the TAU tube terminal 8 to the cashier terminal 7 by causing the turbine blower to blow air through the duct 49 to the end of the air tube 6 via the valve 48, thus propelling the canister towards the cashier station. On the other hand, when the canister is to be returned to the TAU tube terminal, the turbine blower is caused to suck air from the air tube 6 via the valve 47, thus drawing the canister towards the TAU tube terminal 8. This has the advantage that as the canister passes the valve 47 in front of the terminal 8, further evacuation of the tube portion 35 within the terminal 8 is prevented and the canister is braked by a cushion of air within the tube portion of the tube terminal before coming to rest in the tube terminal 8 against an end stop (not shown).

When the canister comes to rest, the motor 40 is operated, possible in response to a signal from the end stop, to rotate the sleeve 38 to the open position. The eccentrically weighted, freely rotatable central portion of the canister naturally comes to rest with the spaced upper edges 23b,24b of the bank note holder 22 facing upwards to the registering openings 36,41 of the sleeved tube portion. If the holder 22 carries bank notes for deposit, the actuators 45,46 operate automatically (in response to a programme preselected by the cashier) to cause the holder opening levers 43,44 to pivot so that an arm of each lever moves into the tube portion 35 through the widened portions 36a,36b of the upper opening. The end of each arm moving into the tube portion 35 carries a roller 50,51 for engaging the outer face of the corresponding clamping plate 23,24 near its upper edge. The lever 44 engages the fixed clamping plate 24 solely to prevent rotation of the canister about its axis upon engagement of the other clamping plate 23 by the lever 43, which is arranged to push the upper edge portion of the clamping plate 23 so that the plate 23 pivots about its pivot axis 28 to move the lower edge portion 23a of the clamping plate away from the fixed plate to the open position 23c shown in FIG. 4. This allows the bank notes previously held by the holder 22 to fall from the holder through the registering bottom openings 37,42 of the tube and sleeve into the deposit box 4. The holder opening levers 43 and 44 are then retracted out of the sleeved tube portion 35 to allow the clamping plate 23 to return to the closed position of the holder ready to receive the next cash withdrawal from the TAU.

When a withdrawal is called for by the cashier, the TAU feed device 9 inserts the bank notes through the registering upper openings 36,41 and into the bank note holder 22, the notes being pushed between the lower end portions 23a,24a and the fingers 25,26 of the clamping plates 23,24. The feed device then releases the thus gripped bank notes, and is retracted from the sleeved tube portion 35. The sleeve 38 is then rotated to the closed position, and the tubine blower operated to propel the canister to the cashier station for removal of the bank notes by the cashier.

As mentioned earlier, the system, may be controlled to operate completely automatically in response to instructions entered on the keyboard 13 by the cashier. Furthermore, the control system (the details of which form no part of the present invention) can be designed to record automatically all cash transactions, both withdrawals and deposits, and to provide for full integration of the data recording system and access codes, etc., with a master computer system.

It will be appreciated that the system, in accordance with the invention is also particularly suitable for use with an automatic cash dispensing unit instead of a manned cashier station be described, the advantage being that the unit itself will not need to be stocked with a reserve of cash since this will be contained at a remote position in the secure area within the building. Thus, the automatic dispensing unit itself does not need to be made secure and will therefore need less space.

It will also be appreciated that the system and canister in accordance with the invention can be used to handle other documents connected with financial transactions besides bank notes, such as cheques, travellers cheques, debit and credit vouchers, etc. References to bank notes appearing hereinbefore and in the following claims are accordingly to be construed as meaning bank notes and other financial transaction documents.

We claim:

1. A canister for carrying bank notes in an air tube conveyor system comprising a pair of interconnected end members, a side having an opening to permit bank notes to be fed into the canister and to be discharged therefrom, said side opening extending substantially the length of the canister between the end members and completely around said canister whereby the side of said canister is completely open between said end members, and a bank note holder arranged to receive and retain bank notes fed into the canister through the side opening, the bank note holder comprising a pair of clamping plates having lower longitudinal edge portions, said pair of clamping plates being mounted between the end members and are biassed towards each other to a closed position in which said plates define a substantially V-shaped trough having a root defined by lower longitudinal edge portions of said plates, whereby bank notes inserted into said trough are received and retained between the lower longitudinal edge portions of the plates at the root of said trough.

2. A canister according to claim 1 wherein said pair of clamping plates of said note holder are movable to a release position to allow bank notes to fall therefrom through said side opening.

3. A canister according to claim 1, in which the lower longitudinal edge portions of the clamping plates are slightly spaced from each other in the closed position, and each clamping plate is provided with a plurality of flexible fingers which extend from its lower longitudinal edge portion and interdigitate with the fingers of the other clamping plate, the fingers being deflectable to allow bank notes to be inserted between them.

4. A canister according to claim 1, in which at least one of the pair of clamping plates is pivotally mounted on the end members so that said at least one plate can pivot about an axis substantially parallel to a longitudinal axis of the canister, and is biassed by spring means to pivot in a direction to move the lower longitudinal edge portion of the plate towards the corresponding edge of the other of said pair of clamping plates.

5. A canister according to claim 4, in which only one of said pair of clamping plates is pivotally mounted, the other of said pair being fixed in position relative to the end members.

6. A canister according to claim 4 in which the at least one pivotally mounted clamping plate is guided during pivotal movement of the plate by means of pins which are carried by the plate and project into guide slots provided in the end members.

7. A canister according to claim 1, in which each of the end members is freely rotatably mounted in an end cap having a peripheral portion arranged to engage the air tube wall during travel of the canister through the tube, and at least one of the end members if eccentrically weighted so that the interconnected end members will together rotate relative to the end caps to a predetermined position when the canister is at rest.

8. A canister according to claim 7, in which the peripheral portion of each end cap is fitted with a circumferential seal made of a suitable low friction material to facilitate the movement of the canister through the air tube.

9. A pneumatic cash handling system comprising an air tube, a canister according to claim 1, freely slidably along the length of the tube between a cashier station tube terminal and a teller assist unit (TAU) tube terminal located in a secure area remote from the cashier station, and means for controlling the air pressure in the tube to drive the canister back and forth between the two tube terminals, at least the TAU tube terminal comprising a portion of the air tube having a first longitudinally extending opening in its wall for providing access to the bank note holder of the canister when the canister is received in the at least the TAU tube terminal, means for stopping the canister in the at least the TAU tube terminal in a predetermined position relative to the opening, a rotatable sleeve closely surrounding the tube portion of the at least the TAU tube terminal and having a first longitudinally extending opening substantially corresponding to the first tube opening, and means for rotating the sleeve to move it between an open position in which its first opening registers with the first tube openign and a closed position in which the first tube opening is shut by the sleeve.

10. A system according to claim 9, in which the air pressure control means for driving the canister along the air tube comprises a blower which is connected to the air tube and is slectively operable to blow or suck air through the tube, the blower being connected to the air tube adjacent an end of the TAU tube terminal nearest to the cashier terminal via a non-return valve which permits air to be sucked from the tube but not blown into the tube, and being further connected to the air tube adjacent an end of the TAU tube terminal furthest from the cashier terminal via a non-return valve which permits air to be blown into the tube but not sucked therefrom.

11. A system according to claim 9, in which the means for stopping the canister at the at least the TAU tube terminal is linked to the means for rotating the sleeve so that the sleeve is opened automatically after the canister reaches its predetermined position in the at least the TAU terminal.

12. A system according to claim 9, in which the tube portion of the TAU tube terminal has a second longitudinally extending opening disposed at a bottom of the tube portion, the second tube opening being diametrically opposite the first opening thereof, and the sleeve also has a second longitudinally extending opening diametrically opposite the first sleeve opening and substantially corresponding to the second opening of the tube portion so that each sleeve opening registers with the corresponding opening of the tube portion when the sleeve is moved to the open position and both opening of the tube portion are shut when the sleeve is moved to the closed position, the TAU tube terminal also comprising means for causing the bank note holder of the canister to release bank notes for discharge through the registering second openings of the tube portion and the sleeve when the sleeve is in the open position and the notes are to be deposited in the secure area.

13. A system according to claim 12, in which the first openings of the tube portion and the sleeve of the TAU tube terminal each has an end, each end being offset in opposite circumferential directions to provide a wider portion on one side at one end, and a corresponding wider portion on the other side at the other end.

14. A system according to claim 13, in which the means for causing the bank note holder to release bank notes comprises a pair of holder opening members which are mounted in the TAU tube terminal on opposite sides of the sleeved tube portion and are movable into the tube portion through the wider portions of the registering first openings of the sleeve and tube portion when the sleeve is in the open position.

* * * * *